United States Patent [19]
Masuda

[11] 3,736,578
[45] May 29, 1973

[54] GALVANO-MAGNETRO EFFECT APPARATUS

[75] Inventor: Noboru Masuda, Kawaguchi, Japan

[73] Assignee: Denki Onkyo Co., Ltd., Tokyo, Japan

[22] Filed: Dec. 31, 1970

[21] Appl. No.: 103,151

[30] Foreign Application Priority Data

Dec. 31, 1969 Japan ....................................44/1363

[52] U.S. Cl.....340/174 HA, 340/174 A, 340/174 M, 340/174 MP, 340/174 PM, 340/174 SP, 340/174 TF

[51] Int. Cl.........................G11c 11/18, G11c 11/02

[58] Field of Search ..................340/174 TF, 174 HA; 179/100.2 CH

[56] References Cited

UNITED STATES PATENTS 3,521,255 7/1970 Arndt ...........................340/174 HA
3,611,358 10/1971 Dalmasso.......................340/174 HA

OTHER PUBLICATIONS

IBM Technical Disclosure Bulletin, Vol. 2, No. 3, Oct. 1959, pg. 50.
Electronics, Sept. 1, 1969, pg. 83 to 87.
Bell Labs Record June/July 1970, pgs. 163 to 169.

*Primary Examiner*—James W. Moffitt
*Attorney*—James E. Armstrong and Ronald S. Cornell

[57] ABSTRACT

A galvano-magnetro effect apparatus wherein a matrix, comprising a plurality of 4-terminal Hall effect devices which form intersections in the matrix, and at least one magnetic pole is provided so that the magnetic flux can be concentrated onto at least one of the Hall effect devices, and input current is supplied from one of the vertical and horizontal terminal sides of the matrix and output voltage is obtained at the other terminal side of the matrix.

12 Claims, 7 Drawing Figures

Patented May 29, 1973

3,736,578

3 Sheets-Sheet 1

Patented May 29, 1973 3,736,578

3 Sheets-Sheet 3

GALVANO-MAGNETRO EFFECT APPARATUS

BACKGROUND OF THE INVENTION

The present invention relates to a galvano-magnetro effect apparatus which is employed in the fixed memory and the counter circuit of a computer.

Conventional fixed memoires are disadvantageous because their service life is short because of the use of punched cards and magnetic drums. Such memories are apt to suffer damage when punched cards are used, and they cannot be made compact when the magnetic durms are used.

Furthermore, conventional computers are disadvantageous in cost because the arithmetic circuits are complicated due to the binary coded decimal (BCD) system, thus resulting in high cost.

The present invention provides a galvano-magnetro effect apparatus which eliminates the disadvantages mentioned above.

SUMMARY

The present invention provides a galvano-magnetro effect apparatus comprised of a matrix which is formed by arranging a plurality of 4-terminal Hall effect devices, each of which forms one intersection on the matrix; a magnetic field applying means which concentrates magnetic flux onto at least one Hall effect device; a power supply circuit through which current is supplied to either the vertical or horizontal terminals of the matrix; and a load circuit which is connected to the other terminals of the matrix.

BRIEF DESCRIPTION OF THE DRAWINGS

The present invention is illustrated in detail in the accompanying drawings whereof.

DETAILED DESCRIPTION

Figure 1:
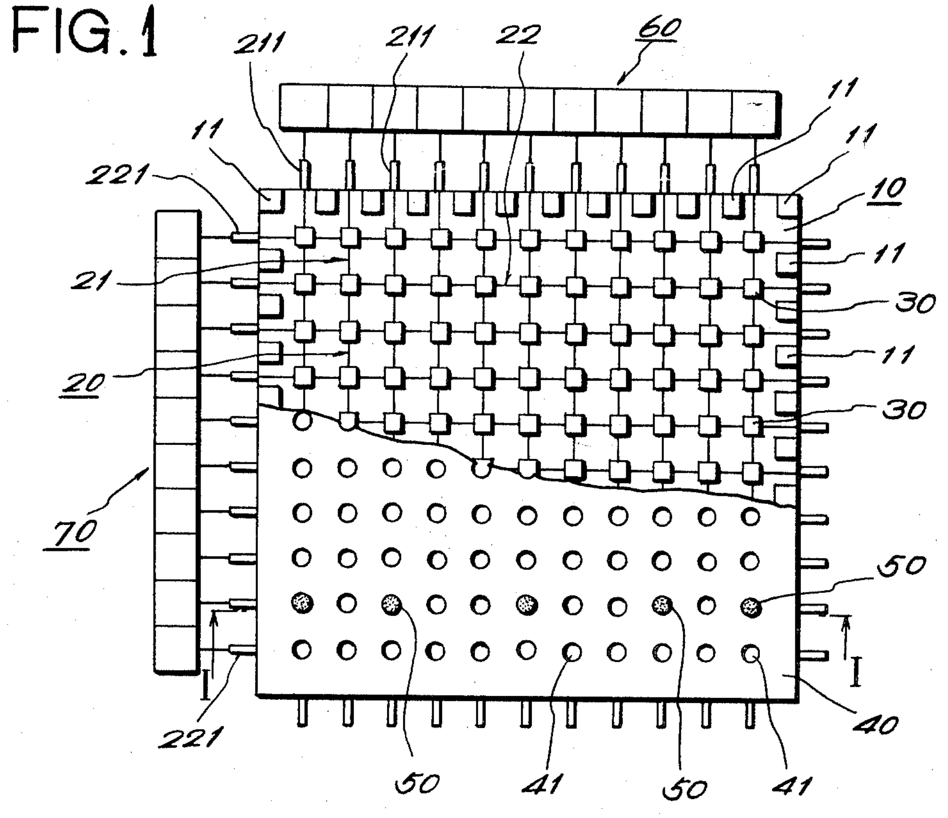
FIG. 1 is a cutaway view of the front side of the apparatus according to the present invention.
Figure 2:
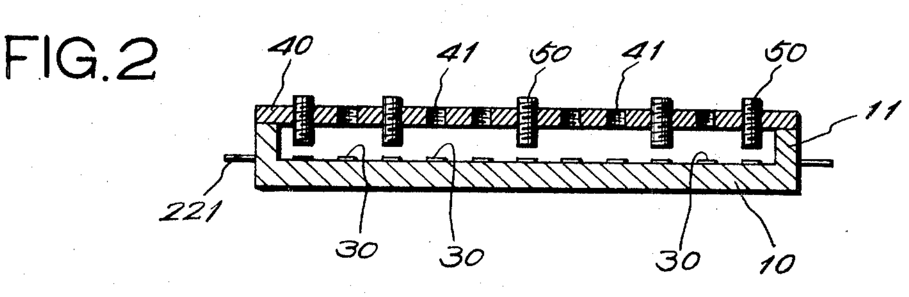
FIG. 2 is a corss-sectional front view as seen along line I—I in FIG. 1.
Figure 3:
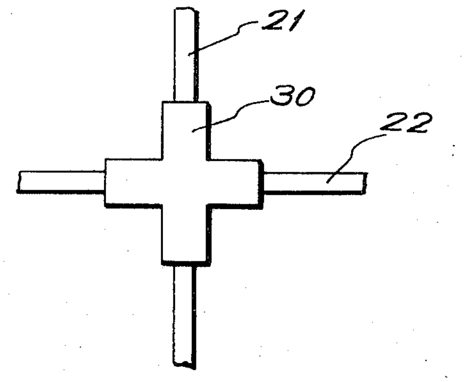
FIG. 3 is a plan view of a Hall effect device to be used in the apparatus according to the present invention.

Referring to FIGS. 1 to 3, there is shown a galvano-magnetro effect apparatus comprised of substrate 10 which is made of a magnetic material and which is provided with projections 11; latticed matrix 20, which is made by metalizing or plating a material such as, for example, an electrical conductor, on substrate 10; a number of Hall effect devices 30 which are respectively arranged at the intersections on matrix 20 while the four terminals of each device are connected to vertical leads 21 and horizontal leads 22; magnetic plate 40 which is arranged in parallel alignment above substrate 10 while being supported by projections 11 of substrate 10 and being provided with through holes 41 which are positioned and aligned above Hall effect devices 30; permanent bar magnets 50 as the magnetic field applying means which are mounted in at least one through hole so that a magnetic pole is positioned near the Hall effect device; power supply circuit 60 which is connected to terminals 211 of vertical leads 21 of the matrix; and load 70, which is connected to terminals 221 of horizontal leads 22 of matrix 20.

The apparatus according to the present invention is as described above. When the current is supplied from power supply circuit 60 to leads 21, Hall voltage is produced in the Hall effect devices which are arranged to oppose magnets 50 and the voltage is applied to load 70.

According to this embodiment of the invention, load 70, which is connected to horizontal leads 22 corresponding to Hall effect devices 30, can be actuated by arranging magnets 50 to oppose preselected Hall effect devices 30.

Hereupon it is desirable to thread through holes 41. Thus, magnets 50 can be easily mounted and dismounted because threaded bar magnet 50 can be fitted into and secured by threaded through holes 41.

By arranging the apparatus of the invention as described above, it offers the folloiwng advantages:

The apparatus can be used permanently because magnets 50 can be mounted in the desired through holes 41 to store information in matrix 20.

Complex information can be stored in matrix 20 in accordance with the positions and number of magnets 50 and new information can be stored merely by shifting magnets 50.

With Hall effect devices being employed, the apparatus can be made compact and a higher output voltage can be obtained. Directional characteristics of the Hall effect devices prevent induction voltage from occurring in adjacent channels.

The Hall effect device can be of the 4-terminal type as shown in FIG. 3; however, a cross type Hall effect device is also advantageous because a favorable output is obtained even if the power is supplied from either the vertical or horizontal terminal sides of the matrix.

Figure 4:
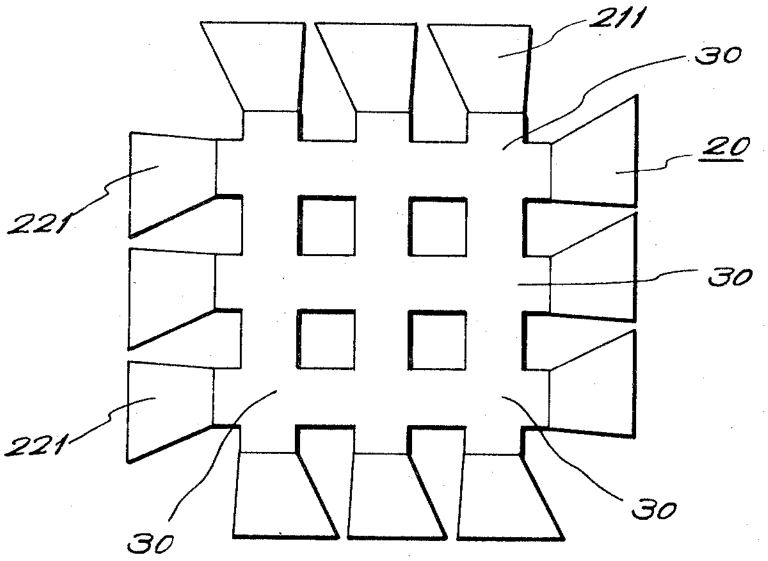
FIG. 4 is a plan view of another embodiment of the latticed matrix to be used in the apparatus according to the present invention.

Matrix 20 need not always be formed with leads 21 and 22. As shown in FIG. 4, one semiconductor layer, which is provided on a substrate made of a magnetic or non-magnetic material, can be shaped in the form of a lattice by a photo-etching process.

To form matrix 20, a number of Hall effect devices 30 can be completely integrated at the same time and leads 21 and 22 are not required; accordingly, the apparatus provides the advantages discussed below.

It becomes easier to make the matrix because a number of Hall effect devices 30 need not be arranged at the intersections of leads 21 and 22.

The temperature characteristic and output characteristic of many Hall effect devices 30 can be uniform. The bar magnet need not always be used as magnetic field applying means 50; for example, a magnetic bubble domain type magnet can be used.

When a magnetic field applying means such as mentioned above is used, the magnetic poles can be shifted by applying a magnetic bias to the magnet; therefore, this means is convenient when changing Hall effect devices 30 which are to be opposed to the magnetic poles of the magnet and are to be actuated, or, in other words, when changing the information which is to be stored in matrix 20.

Figure 5:
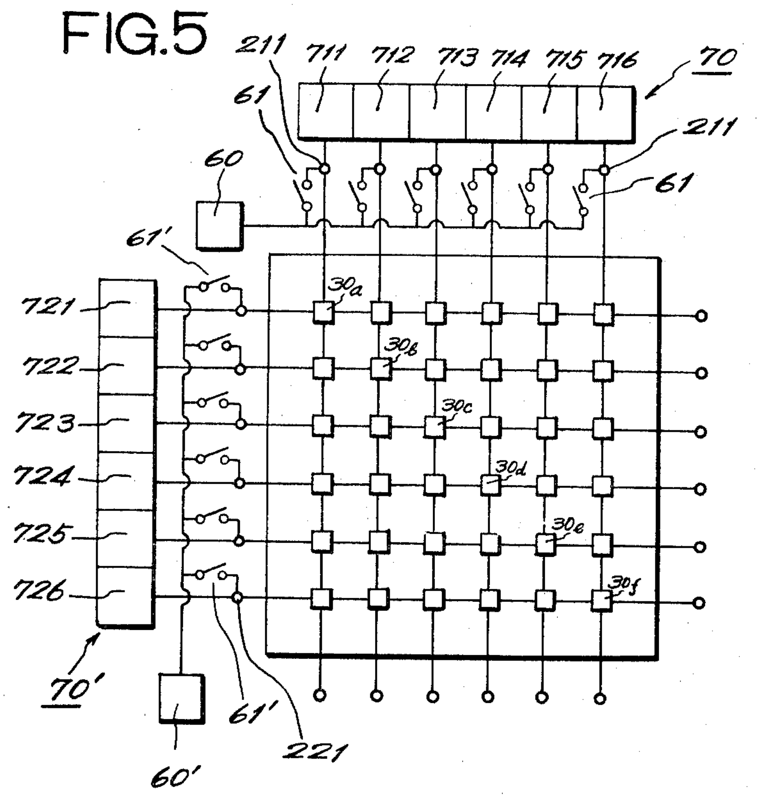
FIGS. 5, 6 and 7 are circuit diagrams which respectively describe embodiments of the present invention.

FIG. 5 illustrates an embodiment of the apparatus of the present invention which is used for data processing. In this embodiment, input power supply circuits 60 and 60' and loads 70 and 70' are respectively connected to vertical and horizontal terminals 211 and 221 of matrix 20.

Input power supply circuits 60 and 60' are provided with means such as, for example, switches 61 and 61' capable of supplying current to terminals 211 and 221, respectively, and loads 70 and 70' have memories which are respectively connected to said terminals.

One group of the memories is connected to vertical terminals 211 and is divided into memories 711, 712, 713, 714, 715 and 716 which store different information according to the order of terminals 211. The other group of memories is connected to horizontal terminals 221 and is divided into memories 721, 722, 723, 724, 725 and 726 which store different information according to the order of horizontal terminals 221.

The memories at the vertical terminal side and at the horizontal terminal side store interrelated information; for example, memories 711 to 716 at the vertical terminal side store persons' names and memories 721 to 726 at the horizontal terminal side store the career data corresponding to the persons whose names are stored in the memories at the vertical terminal side.

Magnetic field applying means 50 are arranged to oppose Hall effect devices 30*a*, 30*b*, 30*c*, 30*d*, 30*e* and 30*f* which connect each of the memories at the vertical terminal side respectively to each of the memories at the horizontal terminal side; accordingly, the magnetic flux is applied to Hall effect devices 30*a* to 30*f* only.

In this case, the persons' names stored in memories 711 to 716 at the vertical terminal side are transferred to memories 721 to 726, which store corresponding career data, at the horizontal terminal side through Hall effect devices 30*a* to 30 *f*.

This embodiment of the present invention is as described above. If the name of a certain person is selected and the current is supplied to connected terminal 211 of, for example, memory 711, Hall effect device 30*a* operates and the career data corresponding to the selected person's name is produced. If the career data of a certain person is selected and the current is supplied to connected terminal 221 of, for example, memory 722 where the selected career data is stored, Hall effect device 30*b* operates and the person's name corresponding to the selected career data is obtained.

Hereupon, the items to be stored in the memories can be freely determined; for example, a persons' name can be stored in combination with a telephone number or the names of commodities can be stored in combination with inventory quantities.

The memories can be provided with other means to take out the stored data; for example, the data can be typed out.

Figure 6:
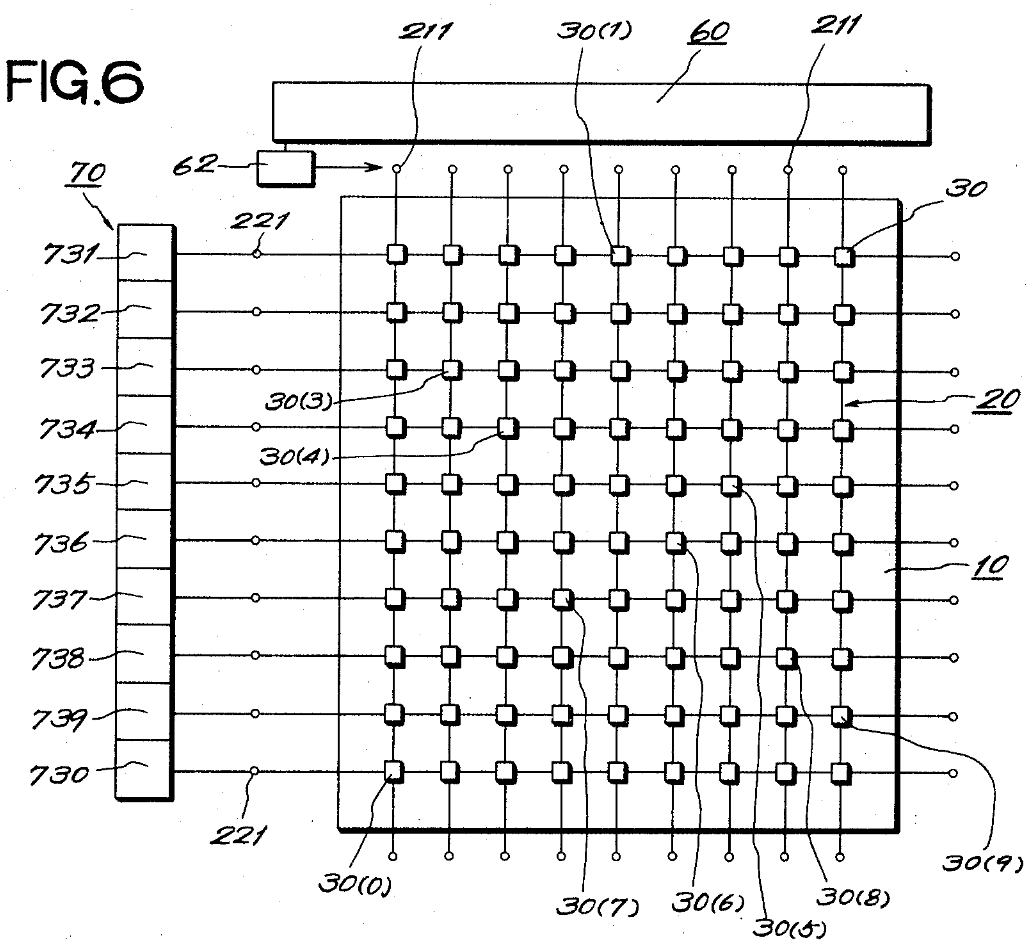

FIG. 6 illustrates an embodiment wherein the apparatus according to the present invention is used as a fixed memory unit for storing telephone numbers.

In this embodiment, power supply circuit 60 is provided with scanning type power supplying member 62. Power supply circuit 60 is formed to supply current to the lines of Hall effect devices in sequence which are series-connected to terminals 211 by scanning as many vertical terinals 211 as the number of digits of the telephone numbers stored in matrix 20 within a given time through scanning type power supplying member 62.

Latticed matrix 20 is provided with ten horizontal terminals 221. Each terminal 221 is connected to impulse generating circuits 731, 732, 733, 734, 735, 736, 737, 738, 739 and 730. These impulse generating circuits 731 to 739 and 730 are arranged to generate the impulses corresponding to numerals 1 to 9 and 0.

This embodiment is as described above. To make the apparatus memorize a telephone number, for example, 03-471-6589, horizontal terminals 221 are assigned for memorizing numerals and vertical terminals 211 for memorizing the number of digits. As shown in FIG. 6, the magnets are provided to oppose Hall effect devices 30 (0), 30 (3), 30 (4), 30 (7), 30 (1), 30 (6), 30 (5), 30 (8) and 30 (9) and the magnetic field may be applied to them.

In this embodiment, when power supplying member 62 is scanned, impulse generating circuits 730, 733, 734, 737, 731, 736, 735, 738 and 739 will be actuated in sequence and the desired telephone number is called.

Figure 7:
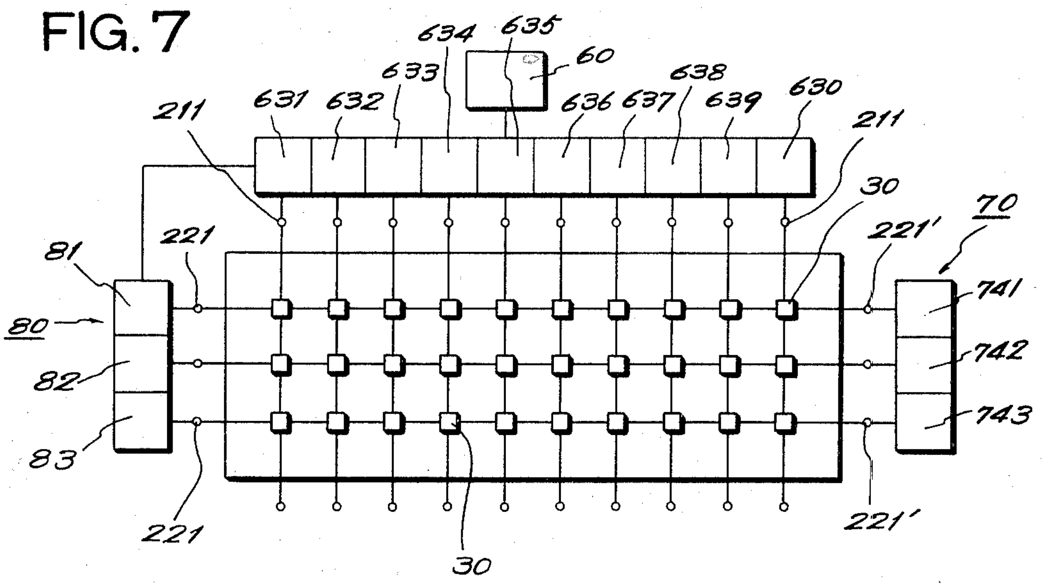

FIG. 7 illustrates an embodiment wherein the apparatus is used as the counter circuit of a computer.

In this embodiment, the magnetic field is applied to all Hall effect devices; accordingly, all Hall effect devices 30 are arranged so as to produce the Hall voltage whenever current is supplied to them.

Latticed matrix 20 is provided with ten vertical terminals 211. Each terminal 211 is connected to push-button switches 631 to 639 and 630. Vertical terminals 211 and Hall effect devices 30 are arranged so that the current from power supply circuit 60 is supplied to only the corresponding vertical row of Hall effect devices 30 which are connected to the push buttons when they are pressed.

The matrix 20 is provided with as many horizontal terminals 221 and 221' as are required at both of its sides. Three pairs of terminals 221 and 221' are shown in the figure. Clock pulse generating device 80 is provided at either the right or left side of matrix 20. It contains clock pulse generating circuits 81 to 83 which are respectively connected to horozontal terminals 221 at one side of the matrix. The counter circuits, for example, flip-flop circuits 741 to 743, which count clock pulse signals, positioned at the other side of matrix 20 are respectively connected to each of the horizontal terminals 221'.

Counter circuits 741 to 743 are arranged so that different numbers of digits are counted in sequence; for example, circuit 741 counts one-digit numbers and circuit 742 counts two-digit numbers.

Therefore, it is necessary to have in circuits 741 to 743 a circuit for shifting the numbers left so that the circuit for high-order digits indicates one when the circuits for the low-order digits of circuit 741 to 743 count 10. When one of push-button switches 631 to 639 and 630 is pressed and the signals of addition, subtraction, multiplication and division are applied, a circuit for detecting the number of digits is required so that counter circuits 742 to 743 for counting more than two-digit numbers do not count the numbers. Counter circuits for indicating numbers of more than two digits are also required when more than two push buttons are pressed continuously.

These circuits which are required as mentioned above are a known means and can be easily formed; for example, 10 clock pulses for one-digit numbers can be generated within the time of, for example, 2 seconds while the push-button switch is being pressed, and 100 clock pulses for two-digit numbers can be generated for 2 seconds.

In this case, the apparatus can be devised so that a special push-button switch, for example, push button 635 synchronizes with the fifth clock pulse for one-digit numbers, 50th clock pulse for two-digit numbers and 500th clock pulse for three-digit numbers when the push button 635 is pressed.

In this case, accordingly, the counter circuit can be selected and the number of digits can be controlled in accordance with the number of push-button switches pressed.

In addition, as another method, as many push buttons as Hall effect devices 30 can be provided and these can be divided for each digit position. Thus, the clock pulse circuit 81 for one-digit numbers can be actuated when one of the push-button switches in the group for one-digit numbers is pressed, and the clock pulse circuit 82 for two-digit numbers, when one of the push buttons in the group for two-digit numbers is pressed. In this case, the number of clock pulse signals per unit time can be fixed and the pulse signals are applied to only one horizontal row of Hall effect devices 30 at all times; therefore, it is only necessary to take into consideration shifting of the number to the left in the counter circuit.

Hereupon the number of contacts of switches can be as many as the number of terminals even though they are provided with as many push-button switches as there are Hall effect devices.

Clock pulse generating circuit 81 is designed to generate pulse signals as many times as required; for example, 10 times while the contact of the switch is closed when one of the push-button switches 631 to 639 and 630 is pressed. Each of push-button switches 631 to 639 and 630 is arranged to synchronize with each pulse signal and to cause the current to flow in vertical terminals 211. In detail, the push-button switches incorporating, for example, flip-flop circuits are devised so that, when push button 631 corresponding to numeral 1 is pressed down, the switch which is actuated by the push button synchronizes with the rise timing of the first clock pulse signal to allow the current to flow and so that push-button switch 632 for numeral 2 and push button 633 for numeral 3 similarly synchronize with the second and third clock pulse signals respectively.

Thus, a high-amplitude pulse signal corresponding to the numeral of the push-button switch is given to counter circuits 721 to 743 by synchronizing push-button switches 631 to 639 and 630 in sequence with the first to tenth clock pulse signals.

For example, when push button 637, corresponding to numeral 7 is pressed, this switch synchronizes with the seventh pulse to allow current to flow in terminals 211. Then Hall effect devices 30 connected to this switch 637 generate the Hall voltage and the seventh high amplitude pulse signal enters into counter circuit 741, that is, high voltage is supplied to counter circuit 741. Accordingly, if counter circuit 741 is arranged so as to be stopped with the high-amplitude pulse signal, the counter circuit stores seven and stops.

When push-button switch 635 for numeral 5 is pressed, the fifth clock pulse signal causes high voltage to be applied to the counter circuit, as mentioned above.

Counter circuits 741 to 743 are designed so as to internally shift a number to the left as mentioned in the foregoing. If counter circuit 741 measures three clock pulse signals after counting seven, counter circuit 742 for two digit numbers operates to indicate one. Accordingly, counter circuit 741 indicates two when the circuit stops with the fifth pulse signal. Combination of clock pulse signals and counter circuits permits addition and multiplication but does not permit subtraction and division. In this case, it is desirable to provide a reverse counter circuit in parallel with the counter circuit through the selector switch.

In this embodiment, it is only necessary that a corresponding pulse can be varied when a specified push-button switch is pressed; for example, Hall effect devices 30 can be arranged so that the Hall voltage occurs in the direction where the pulse voltage is reduced. For this, the polarity of magnetic poles against Hall effect devices 30 can be selected.

Hereupon Hall effect device 30 can be arranged so that the direction of output is different from that of adjacent Hall effect devices. With this arrangement, either of the even-number pulse signals and odd-number pulse signals is increased positively or decreased negatively due to the direction of output voltage of the Hall effect devices. Thus, the detecting ability of the counter circuits will be improved.

Similarly, since the above arrangement of Hall effect devices permits changing of pulse signals of adjacent digits to a positive or negative direction according to the direction of output voltage of the Hall effect devices, it is possible to change the waveform of a synchronized pulse signal which is applied to a counter circuit, for example, circuit 741 for one-digit numbers when the push-button siwtch is pressed and the waveform of a synchronized pulse signal which is applied to counter circuit 742 for two-digit numbers.

It is desirable to use the magnetic bubble domain type magnet mentioned in the foregoing to make the direction of out put voltage of a Hall effect device different from that of other adjacent Hall effect devices. Therefore, magnetic bubble domain type magnets can be mounted above or above and under the matrix.

Furthermore, bias voltage can be applied to the matirx by connecting the bais power supply to either the vertical or horizontal terminals. Thus the apparatus is advantageous because the operation of the load can be easily controlled.

What is claimed is:

1. A galvano-magnetro effect apparatus comprised of a. a grid-type matrix comprising a plurality of connected four-terminal Hall effect devices positioned and arranged so taht each Hall effect device forms one intersection on the matrix and being serially-connected in columns and rows;

b. a magnetic field-applying means for applying a magnetic field in a single direction by means of magnetic poles to at least one but not all of the Hall effect devices, said magnetic field applying means incudling a magnetic plate member below and supporting said matrix and a magnetic material forming a magnetic path with said magnetic plate member disposed above said matrix adapted to be fixedly predeterminative of the position of said magnetic poles independent of the voltage inputs and outputs of said matrix and capable of serving as a memory device;

c. a power supply circuit which supplies current to at least one entire column or row of Hall effect devices of the matrix thrrough at least one terminal of the corresponding vertical or horizontal terminals of the matrix and d. a load, which is connected to at least one terminal of the remaining terminals.

2. A galvano-magnetro effect apparatus according to claim 1, wherein bias voltage is applied to either the vertical or horizontal terminals of the matrix.

3. A galvano-magnetro effect apparatus according to claim 1, wherein said magnetic material is a magnetic plate arranged in parallel with said matrix, said magnetic plate being provided with through holes which oppose the centers of the Hall effect devices, and a bar magnet means is fixedly positioned in at least one of the through holes so that the magnetic poles of the bar magnet means are opposite to at least one Hall effect device such that the subsequent application of an electrical signal by means of said power supply to a terminal of said Hall effect device effects the signal supplied by said Hall effect device to said load.

4. A galvano-magnetor effect apparatus according to claim 3, wherein the through holes are threaded and a threaded bar magnet is removably mounted in at least one of the through holes.

5. A galvano-magnetro effect apparatus according to claim 1, wherein a power supply circuit is connected to either the vertical or horizontal terminals of the matrix and a load is connected to the oppositely directed terminals, and the power supply circuit is provided with a scanning type power supplying member which supplies current to the terminals in a predetermined sequence.

6. A galvano-magnetro effect apparatus according to claim 5, wherein a number of terminals equal to the number of digits of a telephone number are provided at the power supply side, 10 terminals are provided at the load side, and the load-side terminals are connected to the impulse generating circuit corresponding to the digits one to nine and zero.

7. A galvano-magnetro effect apparatus comprised of a. a matrix comprising a plurality of four-terminal Hall effect devices positioned and arranged so that each Hall effect device forms one intersection on the matrix;

b. a magnetic field-applying means for applying a magnetic field to all of said Hall effect devices;

c. clock pulse generating circuits connected to either the vertical or horizontal terminals of said matrix designed to generate a given number of clock pulse signals;

d. power supply circuit means for selectively supplying current to the terminals of said matrix oppositiely directed to the terminals connected to said clock pulse generating circuits;

e. switching means positioned between said power supply circuit means and said oppositely directed terminals for selectively transmitting he current of said power supply means to said terminals, said switches and said clock pulse generating circuits being designed so taht said clock pulse generating circuits generate a given number of clock pulse signals when said switches are actuated, said switches being constructed as a switching mechanism with address signals for respectively selecting corresponding clock pulse signals and for supplying current from said power supply circuit means to the terminal corresponding to the switch actuated when an identified clock pulse signal is selected; and f. clock pulse counter circuits connected to the terminals positioned opposite to said clock pulse generating circuits for counting the pulse signals being constructed to stop with the pulse signal which is selected by the actuation of a switch and is varied by the Hall voltage produced by the selection of the pulse signal by the switch.

8. A galvano-magnetro effect apparatus according to claim 7, wherein the clock pulse counter circuits contain a circuit for shifting the numbers to the left so that mutually adjacent counter circuits for high-order digits count one when a counter circuit for a low-order digit counts a given number of clock pulse signals.

9. A galvano-magnetro effect apparatus comprised of a. a matrix comprising a plurality of four-terminal Hall effect devices positioned and arranged so taht each Hall effect device forms one intersection on the matrix;

b. at least one memory and at least one power supply circuit connected to both the vertical and horizontal terminals of the matrix, the vertical memory and horizontal memory storing interrelated information and the corresponding vertical and horizontal memories being connected through one Hall effect device;

c. a magnetic field-applying means arranged opposite each of the Hall effect devices connecting the corresponding vertical and horizontal memories for applying a magentic field thereto; and d. switches each provided between the power supply circuits and the terminals connected thereto.

10. A galvano-magnetro effect appartus comprised of a. a matrix comprising a plurality of four-terminal Hall effect devices positioned and arranged so that each Hall effect device forms one intersection on the matrix, said matrix being a lattice-type semiconductor in which the intersection points thereof form said Hall effect devices;

b. a magnetic field-applying means for applying a magnetic field by means of magnetic poles to at least one of the Hall effect devices, said magnetic field applying means including a first magnetic material below and supporting said matrix and a second magnetic material forming a magnetic path with said first magnetic material disposed above said matrix adapted to be predeterminative of the position of said magnetic poles independent of the voltage inputs and outputs of said matrix;

c. a power supply circuit which supplies current to at least one terminal of the vertical and horizontal terminals of the matrix and d. a load, which is connected to at least one terminal of the remaining terminals.

11. A galvano-magnetro effect appartus comprised of a. a matrix comprising a plurality of four-terminal Hall effect devices positioned and arranged so taht each Hall effect device forms one intersection on the matrix;

b. a magnetic field-applying means for applying a magnetic field by means of magnetic poles to at least one of the Hall effect devices, said magnetic field applying means including a first magnetic material below and supporting said matrix and a second magnetic material forming a magnetic path with said first magnetic material disposed above said matrix adapted to be predeterminative of the position of said magnetic poles independent of the voltage inputs and outputs of said matrix, at least one magnetic bubble domain type magnet being used as the magnetic field-applying means and said second magnetic material being magnetized with at least one magnetic pole being fixedly positioned opposite at least one Hall effect device;

c. a power supply circuit which supplies current to at least one terminal of the vertical and horizontal terminals of the matrix and d. a load, which is connected to at least one terminal of the remaining terminals.

12. A galvano-magnetro effect apparatus comprised of a. a matrix comprising a plurality of four-terminal Hall effect devices positioned and arranged so that each Hall effect device forms one intersection on the matrix;

b. a magnetic field-applying means for applying a magnetic field by means of magnetic poles to at least one of the Hall effect devices, said magnetic field applying means including a first magnetic material below and supporting said matrix and a second magnetic material forming a magnetic path with said first magnetic material disposed above said matrix adapted to be predeterminative of the position of said magnetic poles independent of the voltage inputs and outputs of said matrix;

c. at least one memory and at least one power supply circuit connected to both the vertical and horizontal terminals of the matrix, the vertical memory and horizontal memory storing interrelated information and the correspoinding vertical and horizontal memories being connected through a Hall effect device, and magnetic field-applying means being arranged to oppose the Hall effect device which serves as the intermediate for the corresponding vertical and horizontal memories;

d. a switch provided between the power supply circuits and the terminals.

* * * * *